United States Patent [19]
Smith

[11] 3,892,910
[45] July 1, 1975

[54] FLOOD COVER FOR PEDESTAL CLOSURE

[75] Inventor: Arnold Ray Smith, Chester, N.J.

[73] Assignee: Bell Telephone Laboratories, Incorporated, Murray Hill, N.J.

[22] Filed: Sept. 9, 1974

[21] Appl. No.: 504,086

[52] U.S. Cl. ............... 174/37; 248/226 D; 248/229
[51] Int. Cl.² .......................................... H02G 9/02
[58] Field of Search ............ 174/1, 37, 38, 60; 52/3, 52/23; 61/69 R; 220/15, 18, 85 A; 248/221, 226 D, 229

[56]  References Cited
UNITED STATES PATENTS

| | | | |
|---|---|---|---|
| 2,247,936 | 7/1941 | Bishop | 174/37 UX |
| 3,033,912 | 5/1962 | Phillips | 174/38 |
| 3,162,718 | 12/1964 | Gunthel, Jr. | 174/38 |
| 3,466,380 | 9/1969 | Baumgartner et al. | 174/38 |
| 3,482,030 | 12/1969 | Wisniewski | 174/37 |
| 3,538,236 | 11/1970 | Baumgartner | 174/38 |
| 3,557,299 | 1/1971 | Dienes | 174/38 |
| 3,710,003 | 1/1973 | Channell | 174/37 |
| 3,728,467 | 4/1973 | Klayum et al. | 174/38 |
| 3,769,443 | 10/1973 | Pierzchala et al. | 174/38 |
| 3,812,279 | 5/1974 | Voegeli | 174/38 |

FOREIGN PATENTS OR APPLICATIONS

| | | | |
|---|---|---|---|
| 877,030 | 5/1953 | Germany | 174/37 |

*Primary Examiner*—Laramie E. Askin
*Attorney, Agent, or Firm*—A. D. Hooper

[57]  ABSTRACT

A flood cover for pedestal closures comprises a bell jar container adapted for installation over the closure. A mounting bracket clamps about the closure below the terminal chamber and includes mounting flanges thereon to which the container can be fastened to hold the container in place over the closure. The bracket is adjustable to permit its use with closures of different sizes and shapes. Water is prevented from rising into the terminal chamber by the entrapment of air in the container.

4 Claims, 4 Drawing Figures

FLOOD COVER FOR PEDESTAL CLOSURE

BACKGROUND OF THE INVENTION

1. Field of the Invention

This invention relates to pedestal closures for buried communications cables and more particularly to a flood cover for such closures.

2. Description of the Prior Art

Pedestal closures for housing splices and terminations of buried telephone cable are frequently installed in areas where they are subject to inundation by flood waters. Water entering the terminal or splicing chamber of such closures can cause extensive damage such as producing corrosion and other damage to splices and terminal blocks within the closure, and water can enter the cable sheath through the exposed ends within the closure which can damage the cable conductors.

Attempts to prevent damage from entry of rising water into the terminal chamber of pedestal closures have included mounting the closure atop extension sections so that the terminal chamber is raised to a height above any expected water level and the use of sealed pedestal closures. Such attempts have not been completely satisfactory because of the increased difficulty of gaining access to the terminal chamber and the relative complexity of sealed closures. Further, there are large numbers of pedestal closures already installed which cannot be readily adapted to any of the present proposals for preventing water entry. The costs of replacing such closures by sealed closures or the installation of extension sections thereunder would be prohibitive.

Accordingly, it is an object of this invention to improve the means for preventing the entry of water into the terminal chamber of pedestal closures.

Another object is to provide a means of preventing the entry of water into the terminal chamber of pedestal closures which can be readily retrofitted to previously installed closures.

Another object is to provide a universal flood cover for pedestal closures of many sizes and shapes.

SUMMARY OF THE INVENTION

The foregoing objects and others are achieved in accordance with this invention by a flood cover comprising a cap, cover or container having one open end adapted for installation over the top of a pedestal closure. A mounting bracket comprising two halves is installed about the closure below the terminal chamber. The bracket halves are adjustable to allow installation about closures having different sizes and configurations. The bracket halves include flanges thereon having mounting holes therein. Mounting bolts mate with the mounting holes and mounting slots around the open end of the cap or container to hold it in place over the closure. When water rises about the closure, air is entrapped in the container and prevents the entry of the water into the terminal chamber.

BRIEF DESCRIPTION OF THE DRAWING

The invention will be more fully comprehended from the following detailed description and accompanying drawing in which.

DETAILED DESCRIPTION

Figure 1:
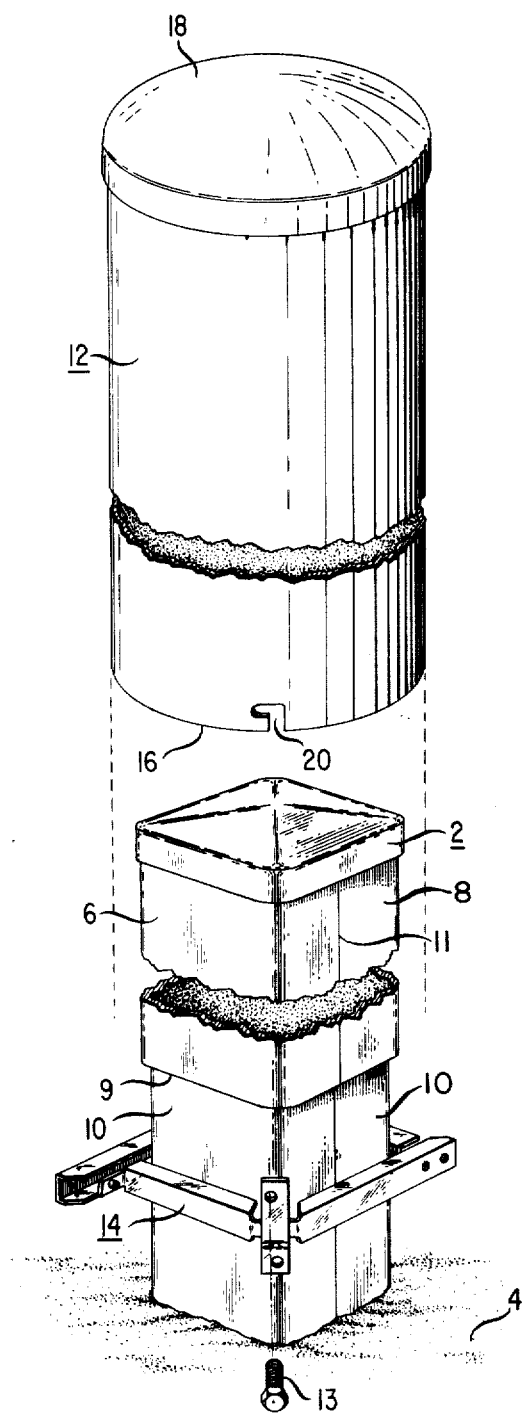
FIG. 1 is an exploded perspective view of the flood cover of this invention installed over a pedestal closure.

Referring now to FIG. 1, there is shown a partly buried pedestal closure 2 extending upward from the ground line 4 and adapted to have buried communications cables looped upward therein. The conductors of such cables are thus made accessible for making connections thereto in the upper interior of the closure commonly known as the splicing or terminal chamber or compartment. Closure 2 normally comprises mating upper front and rear covers or channel-shaped members 6 and 8, respectively. Upper front cover 6 can be readily disengaged from cover 8 to provide access to the terminal chamber. The joint 11 between covers 6 and 8 and the joint 9 between these covers and lower cover 10 are loose so that any water rising about closure 2 has ready access to the terminal chamber. Other configurations of pedestal closures known in the art also have loose joints between various portions thereof which permit entry of rising water into the terminal chamber.

In accordance with this invention, a flood cover comprising a container, cap, or cover 12 and a mounting bracket 14 prevents water from rising about closure 2 to a height which allows entry thereof into the terminal chamber of the closure. Cap 12 comprises a hollow generally cylindrical body having one open end 16 and one closed end 18. For ease of manufacture, end 18 advantageously comprises a separate lid which is mounted on container 12, as by welding, after the body of container 12 has been formed, to form an airtight end. Open end 16 and the interior of container 12 are of sufficient size to permit the installation of container 12 over a pedestal closure 2 of any expected size. Open end 16 includes a plurality of mounting slots 20 around the periphery thereof.

Figure 2:
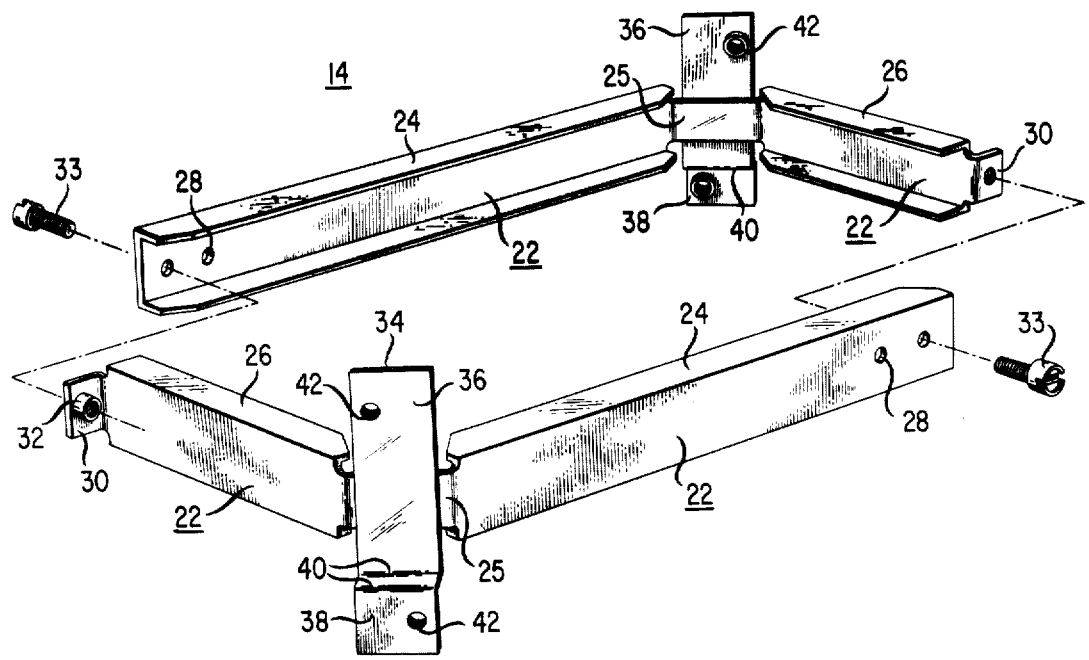
FIG. 2 is a more detailed perspective view of the mounting bracket for the flood cover.

As shown in detail in FIG. 2, mounting bracket 14 comprises two substantially identical bracket halves 22 which are mounted to each other about the exterior surface of closure 2 below the terminal compartment therein. Each bracket half 22 comprises a substantially L-shaped structure having a relatively long leg 24 and a relatively short leg 26 at substantially right angles with respect to each other and joined by a short section 25 oriented at an acute angle with respect to both legs 24 and 26. The long leg 24 has two holes or slots 28 therein, and short leg 26 has a tab or flange 30 extending outward therefrom with a clinch nut 32 or similar mounting hardware mounted thereon. The two bracket halves 22 are oriented at substantially right angles with each other so that the clinch nut 32 on one half 22 is aligned with a selected mounting hole 28 on the other bracket half 22. The particular hole 28 with which clinch nut 32 is aligned depends upon the size of the closure 2 to be encompassed by bracket 14. This selection of holes 28 allows the previously mentioned adjustment of bracket 14 to different sizes. Bracket halves 22 are fastened to each other about closure 2 by appropriate bolts or similar hardware 33 through holes 28 and clinch nuts 32.

If desired, flange 30 can be formed separately from short leg 26 and can include an extension which lies along the inside of leg 26. A plurality of mounting holes can be provided along leg 26 which allows flange 30 to be adjustably mounted with respect to leg 26. Thereby a further method of adjustment of the size of bracket 14 can be provided.

Bracket half 22 includes a flange 34 mounted on section 25 at substantially right angles thereto at the intersection of legs 24 and 26. Flange 34 includes two ends 36 and 38 having respective clinch nuts 42 or similar mounting hardware thereon. End 36 lies in a plane in close proximity to the plane of section 25 whereas the plane of end 38 is spaced outward from the plane of section 25 by means of bends 40 in flange 34. Clinch nuts 42 are adapted to be aligned and joined with mounting slots 20 on end 16 of cover 12 by appropriate mounting hardware such as bolts 13 to hold cover 12 in place over closure 2. The configuration of flange 34 provides a constant diameter mounting means for cover 12 regardless of which ones of holes 28 are utilized. For example, if it is desired to protect a relatively large closure 2, bracket halves 22 would be mounted to each other about such closure with clinch nuts 32 mating with the outer one of holes 28, i.e., the one of the holes nearest the outer end of leg 24. If flange 30 is adjustable with respect to leg 26, it would be extended outward the maximum amount. In this configuration, bracket 14 would be able to enclose the maximum size closure 2 expected to be protected. Bracket halves 22 would be oriented about the closure 2 so that ends 36 of the flanges 34 would extend upward from bracket 14 and ends 38 would extend downward as shown in FIG. 1. Cover 12 would then be fastened to bracket 14 over closure 2 by utilizing the mounting apparatus 42 on ends 36. On the other hand, if a relatively small closure 2 is involved, bracket halves 22 are mounted to each other with clinch nuts 32 aligned with the inner ones of holes 28 and brackets 30 are moved inward with respect to legs 26 as far as possible. In this configuration bracket halves 22 are oriented about closure 2 so that ends 38 of flanges 34 extend upward from bracket 14 and ends 36 extend downward. The distance between the clinch nuts 42 on ends 38 in this "small closure" configuration is the same as the distance between clinch nuts 42 on ends 36 in the "large closure" configuration. Accordingly, cover 12 readily mounts to bracket 14 even though bracket 14 may be expanded or contracted to encompass different size closures.

Figure 3:
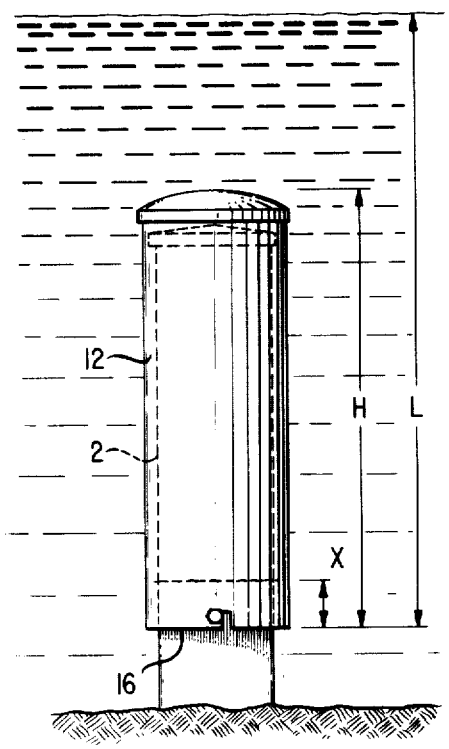
FIG. 3 is a schematic representation of the functioning of the flood cover under high water conditions.

Bracket halves 22 are clamped together about closure 2 by appropriate hardware 33 through clinch nuts 32 and holes 28. These bracket halves 22 grip closure 2 with sufficient force to provide a strong anchor for cover 12. As water rises about closure 2, air is entrapped in the closed end of cover 12. This entrapped air prevents the water from rising as fast within cover 12 as it does outside of the cover. As illustrated in FIG. 3, the water level within cover 12 as a function of the level outside cover 12 is given by $$X = H \left[ 1 - \frac{P}{P + \frac{dL}{144}} \right]$$

where:
X is the height of the water in cover 12 above open end 16;
H is the height of cover 12 above open end 16;
P is the atmospheric pressure;
d is the weight density of water; and
L is the height or level of the surrounding water above open end 16 of cover 12.

As an example, a water level of about 20 feet above the bottom of cover 12, i.e., a height L of 20 feet, will produce a water level within cover 12 of slightly more than ten inches above the bottom of the cover. Accordingly, bracket 14 can be placed far enough below the terminal chamber of closure 2 to insure that the water level within cover 12 and thereby within closure 2 will not reach the terminal chamber for any expected flood level.

Figure 4:
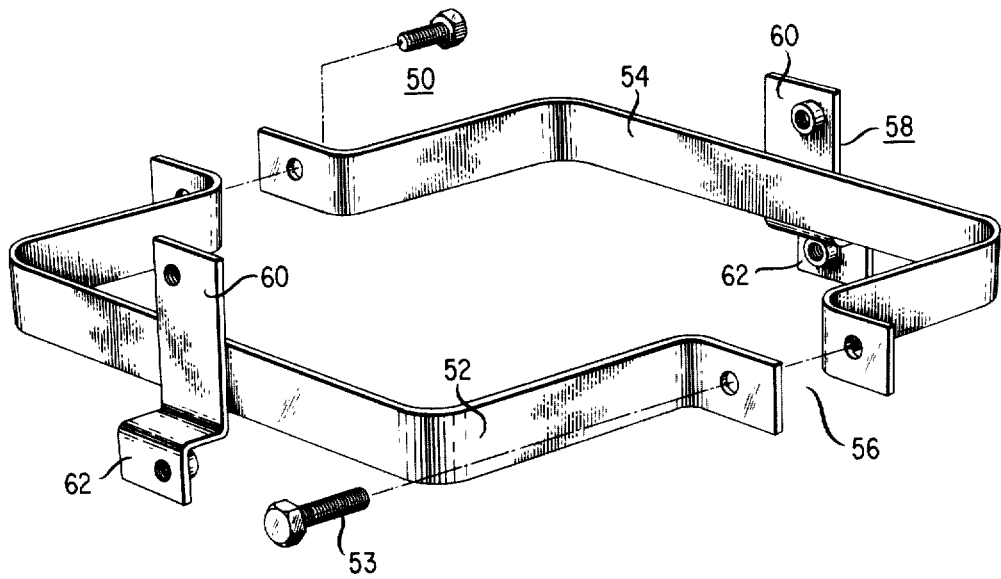
FIG. 4 is a perspective view of a second embodiment of the mounting bracket.

FIG. 4 illustrates a second embodiment of a bracket 50 which can be used to mount cover 12 over closure 2. In this embodiment two bracket halves 52 and 54 are placed about closure 2 and fastened together by appropriate hardware 53. For large closures, bracket halves 52 and 54 will not reach completely around the closure but rather a gap 56 will occur between the ends thereof. End 60 of flange 58 will extend upward in this configuration. For small closures, the gap between halves 52 and 54 will be smaller or non-existent and end 62 of flange 58 will extend upward. These ends provide a "constant diameter" mount for cover 12 as previously discussed with respect to bracket 14.

Cover 12 and bracket 14 can readily be installed over any existing closure in the field without any modification thereof. Cover 12 can be quickly removed and subsequently reinstalled any time access to the interior of closure 2 is required. Bracket 14 need not be disturbed during such access.

While the invention has been described with reference to a specific embodiment, it is to be understood that various modifications might be made thereto without departing from its spirit and scope.

What is claimed is:

1. In combination with a pedestal closure, a flood cover for preventing the entry of water into the terminal chamber of said pedestal closure comprising in combination:
   an elongated container having a first open end installed over said closure and a second closed end sealed to prevent the leakage of air therethrough, said container including first mounting means about said first end; and
   bracket means mounting said container over said closure comprising first and second bracket halves, fastening means fastening said halves together about said closure below said terminal chamber to securely clamp said halves to said closure, flange means extending from each said bracket half and including second mounting means thereon connected with said first mounting means on said container and holding said container over said closure whereby water is prevented from entering said terminal chamber by the entrapment of air in said container.

2. Apparatus in accordance with claim 1 wherein said closure can comprise one of a plurality of closures having different sizes and shapes and said container comprises a hollow cylinder having a cap on said second end and said first mounting means comprise mounting slots around said first end;
   said first and second bracket halves are substantially identical with each said bracket half comprising a generally L-shaped structure having first and second legs joined by a relatively short intermediate section, said first leg having first and second mounting holes therealong, said second leg having a tab extending therefrom with a mounting hole therein, said first and second bracket halves being oriented with respect to each other so that said mounting hole in said tab on said second leg of a respective bracket half is aligned with a respective one of said mounting holes in said first leg of the other of said bracket halves; and said fastening means comprises threaded bolts for insertion in said holes in said tabs and a respective said mounting holes in said first legs whereby said first and second bracket halves can be adjusted to clamp about said pedestal closures having said different sizes and shapes.

3. Apparatus in accordance with claim 2 wherein said flange means comprises a flange having first and second ends including threaded openings therein and lying in different planes with respect to each other, said flange being mounted to said intermediate section so that said first and second ends extend away from said intermediate section at approximately right angles, said second mounting means comprises mounting bolts for insertion in said threaded openings and said mounting slots on said container to hold said container over said pedestal closure.

4. Apparatus in accordance with claim 1 wherein:
said container comprises a hollow cylinder having a cap on said second end and said first mounting means comprises mounting slots around said first end;

said first and second bracket halves are substantially identical with each said bracket half comprising a substantially U-shaped structure having first and second legs and a base, said first and second legs each including a lip extending outward therefrom and having a mounting opening therein, said bracket halves being installed about said closure with said lips of one said bracket half in opposing relationship to said lips of the other of said bracket halves, and said flange means comprises a flange mounted on said base and having first and second ends with mounting holes therein extending away from said base at substantially right angles thereto;

said fastening means comprises bolts inserted through said openings in respective opposing lips to thereby mount said bracket halves about said closure; and said flood cover further includes mounting bolts inserted in said mounting slots and said holes on respective said ends of said flanges whereby said container can be fastened to said bracket halves over said closure.

* * * * *